(12) United States Patent  (10) Patent No.: US 6,994,384 B2
Shuler et al.  (45) Date of Patent: Feb. 7, 2006

(54) INTEGRATED SOLITARY BUMPER BEAM

(75) Inventors: Stephen Shuler, Royal Oak, MI (US); Adam Trappe, Chesterfield, MI (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/640,295

(22) Filed: Aug. 13, 2003

(65) Prior Publication Data

US 2004/0094977 A1 May 20, 2004

Related U.S. Application Data

(60) Provisional application No. 60/427,844, filed on Nov. 20, 2002.

(51) Int. Cl.
B60R 19/03 (2006.01)

(52) U.S. Cl. ..................................... 293/120; 293/110

(58) Field of Classification Search ................. 293/102, 293/110, 120, 123, 130, 132, 133
See application file for complete search history.

(56) References Cited

U.S. PATENT DOCUMENTS

| 3,888,531 A | 6/1975 | Straza et al. |
| 3,930,665 A | 1/1976 | Ikawa |
| 3,933,387 A | 1/1976 | Salloum et al. |
| 3,997,207 A | 12/1976 | Norlin |
| 4,029,350 A | 6/1977 | Goupy et al. |
| 4,186,915 A | 2/1980 | Zeller et al. |
| 4,190,276 A | 2/1980 | Hirano et al. |
| 4,227,593 A | 10/1980 | Bricmont et al. |
| 4,275,912 A | 6/1981 | Bayer |
| 4,397,490 A | 8/1983 | Evans et al. |
| 4,413,856 A | 11/1983 | McMahan et al. |
| 4,533,166 A | 8/1985 | Stokes |
| 4,573,724 A | 3/1986 | Campen |
| 4,652,032 A * | 3/1987 | Smith ......................... 293/120 |
| 4,671,550 A * | 6/1987 | Molnar ....................... 293/120 |
| 4,762,352 A | 8/1988 | Enomoto |
| 4,856,833 A * | 8/1989 | Beekman .................... 293/120 |
| 4,941,701 A | 7/1990 | Loren |
| 4,951,986 A * | 8/1990 | Hanafusa et al. ........... 293/120 |
| 5,056,840 A | 10/1991 | Eipper et al. |
| 5,141,273 A | 8/1992 | Freeman |
| 5,219,197 A * | 6/1993 | Rich et al. .................. 293/120 |
| 5,265,925 A * | 11/1993 | Cox et al. ................... 293/120 |
| 5,290,078 A * | 3/1994 | Bayer et al. ................ 293/120 |
| 5,293,973 A * | 3/1994 | Thum ......................... 188/377 |
| 5,385,375 A | 1/1995 | Morgan et al. |
| 5,404,974 A * | 4/1995 | Thum et al. ................ 188/372 |
| 5,425,561 A | 6/1995 | Morgan |
| 5,441,319 A | 8/1995 | Oyama et al. |
| 5,746,419 A | 5/1998 | McFadden et al. |
| 5,876,078 A | 3/1999 | Miskech et al. |
| 5,988,713 A | 11/1999 | Okamura et al. |
| 6,082,792 A | 7/2000 | Evans et al. |
| 6,102,470 A | 8/2000 | Heim et al. |
| 6,179,355 B1 * | 1/2001 | Chou et al. ................. 293/132 |
| 6,247,745 B1 | 6/2001 | Carroll, III et al. |

(Continued)

Primary Examiner—Patricia L. Engle

(57) ABSTRACT

An unitary bumper unit is adapted for attachment to a vehicle for absorbing forces generated from an impact and comprises a singularly molded part combining a relatively stiff beam portion for attachment to a vehicle and an impact energy absorber integrally molded together with the beam portion wherein the energy absorber faces in a forward direction for absorbing energy due to an impact with the said energy absorber having a crushable forward projecting members adapted to crush upon impact.

19 Claims, 5 Drawing Sheets

U.S. PATENT DOCUMENTS

| | | | |
|---|---|---|---|
| 6,364,384 B1 * | 4/2002 | Kemp et al. | 293/120 |
| 6,406,081 B1 | 6/2002 | Mahfet et al. | |
| 6,554,332 B1 * | 4/2003 | Schuster et al. | 293/102 |
| 6,575,510 B2 * | 6/2003 | Weissenborn | 293/121 |
| 6,663,150 B1 * | 12/2003 | Evans | 293/120 |
| 6,669,251 B2 * | 12/2003 | Trappe | 293/120 |
| 6,685,243 B1 * | 2/2004 | Evans | 293/102 |
| 2003/0060462 A1 * | 5/2002 | Glance | 293/120 |
| 2002/0149213 A1 * | 10/2002 | Weissenborn | 293/120 |
| 2003/0020291 A1 * | 1/2003 | Roussel et al. | 293/120 |
| 2003/0047952 A1 * | 3/2003 | Trappe | 293/120 |
| 2003/0080573 A1 * | 5/2003 | Marijnissen et al. | 293/132 |
| 2003/0189343 A1 * | 10/2003 | Evans et al. | 293/120 |

* cited by examiner

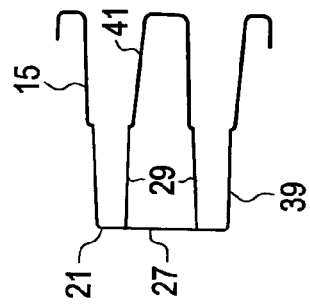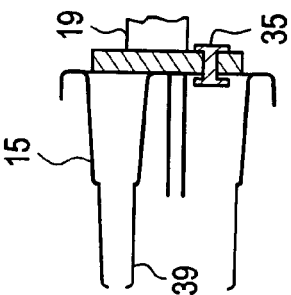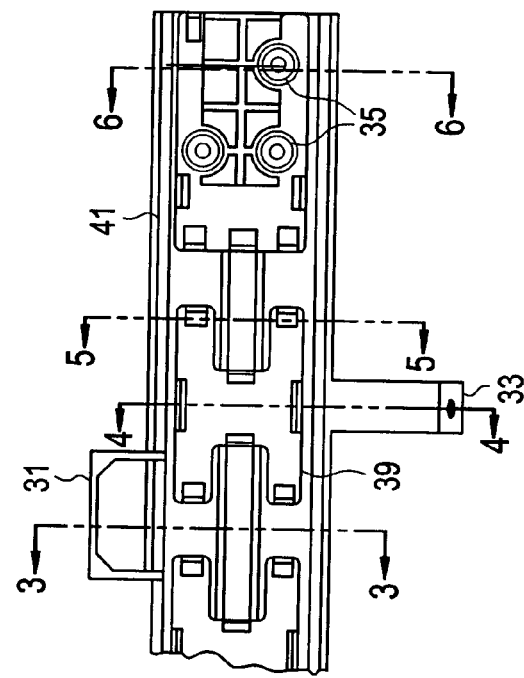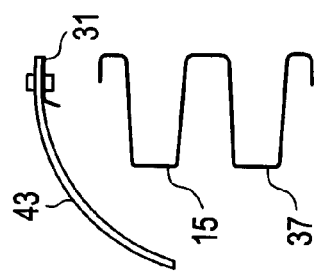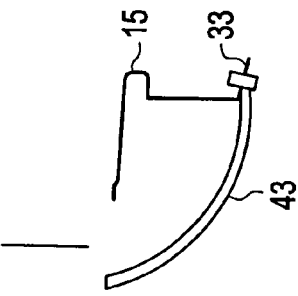

INTEGRATED SOLITARY BUMPER BEAM

CROSS REFERENCE TO RELATED APPLICATIONS

This application claims priority to U.S. Provisional Application Ser. No. 60/427,844 filed on Nov. 20, 2002, which is incorporated herein by reference in its entirety.

FIELD OF INVENTION

The field of invention is bumper systems that are adaptable to provide pedestrian protection in a bumper on an automotive vehicle.

BACKGROUND OF THE INVENTION

Future legislation in Japan and European countries may require an energy absorbent design for a vehicle bumper system to help protection a pedestrian's legs from an impact.

Current bumper impact systems employ several separate components, which are assembled. Generally, these components include a soft energy absorber backed by stiff reinforcing beam to achieve US FMVSS and European ECE42 impact. The component parts of the energy absorber may be a thermoplastic resin or polypropylene foam adjacent a stiff supporting reinforcing beam of steel or aluminum. The bumper assembly typically includes a reinforcing beam, which is configured to attach to vehicle rails, an energy absorber, and an aesthetic fascia attachable to the energy absorber. The fascia typically substantially envelops both the reinforcing beam and energy absorber.

Traditional vehicle bumper and bumper energy absorber systems have been designed to protect vehicle structures and possibly occupants of the vehicle during low speed, about 5 miles per hour (mph), in a vehicle-to-vehicle or vehicle-to-solid structure impact. The new legislation requires a level of pedestrian protection during impact with the front end of an automotive vehicle. The impact energy levels during such an occurrence are much lower than the traditional 5 mph vehicle bumper impacts. Systems designed for 5 mph vehicle bumper impact are maybe too stiff to provide a sufficient level of pedestrian injury mitigation.

Desirable features of bumper systems include adaptability of the system to provide for US FMVSS 5 mph impact requirements, European ECE42 legislation, Allianz impact requirements and European Pedestrian Protection for lower and upper leg or legs.

SUMMARY OF INVENTION

According to an embodiment, a unitary bumper unit comprises a singularly molded part combining a relatively stiff beam portion for attachment to a vehicle and an impact energy absorber integrally molded together with the beam portion and facing in a forward direction for absorbing energy due to an impact. In an embodiment, the energy absorber portion comprises a forwardly projection portion extending longitudinally across the beam and adapted to crush upon impact to absorb forces generated during impact. In an embodiment, the beam portion extends longitudinally across the front of a vehicle and is adapted for attachment to forwardly projecting supports or rails that extend outwardly from the front of the vehicle and are typically attached to the frame of the vehicle. In an embodiment, the forwardly projecting portion includes a crushable portion for initiating at least the partial collapse of said forwardly projecting portion for absorbing forces created by an impact. The energy absorber and the beam portion are molded from a thermoplastic resin material wherein energy from an impact is desirable absorbed by energy absorber portion and the beam portion. According to one embodiment, the energy absorbing system has a construction, which promotes enhanced energy absorption efficiency. The system is desirable adaptable for applications where low levels of energy need to be absorbed, such as in the area of pedestrian protection upon impact with the front end of an automotive vehicle. Desirable embodiments include constructions which promotes superior energy absorption efficiency, especially where low levels of energy need to be absorbed as in the area of pedestrian protection upon impact with the front end of an automotive vehicle.

Traditional vehicle bumper and bumper energy absorber systems have been designed to protect vehicle structures of the vehicle during low speed (about 5 miles per hour (mph)) in a vehicle-to-vehicle or vehicle-to-solid structure impact. New legislation has been introduced in at least Europe and Japan to require a level of pedestrian protection during impact with the front end of an automotive vehicle. The impact energy levels during such an occurrence are much lower than the traditional 5 mph vehicle bumper impacts. Therefore, systems designed for 5 mph vehicle bumper impact are too stiff to provide a sufficient level of mitigating pedestrian injury.

According to an embodiment, the solitary bumper unit is desirably adapted to minimize or mitigate pedestrian injury at low levels of speed and in particularly mitigate lower and upper leg injuries. The bumper unit comprises a singular injection molded combination of a reinforcing bumper beam and an energy absorber with the energy absorber comprising crushable members such as crush cans for absorbing the energy of impact, preferable at low speeds which may provide for lower and upper pedestrian leg protection.

BRIEF DESCRIPTION OF THE DRAWINGS

FIG. 2 is a partial front view of the singular solitary bumper unit of FIG. 1.

FIG. 3 a schematic cross sectional view along section 3—3 of FIG. 2.

FIG. 4 a schematic cross sectional view along section 4—4 of FIG. 2.

FIG. 5 a schematic cross sectional view along section 5—5 of FIG. 2.

FIG. 6 a schematic cross sectional view along section 6—6 of FIG. 2.

DETAILED DESCRIPTION OF THE INVENTION

Figure 1:
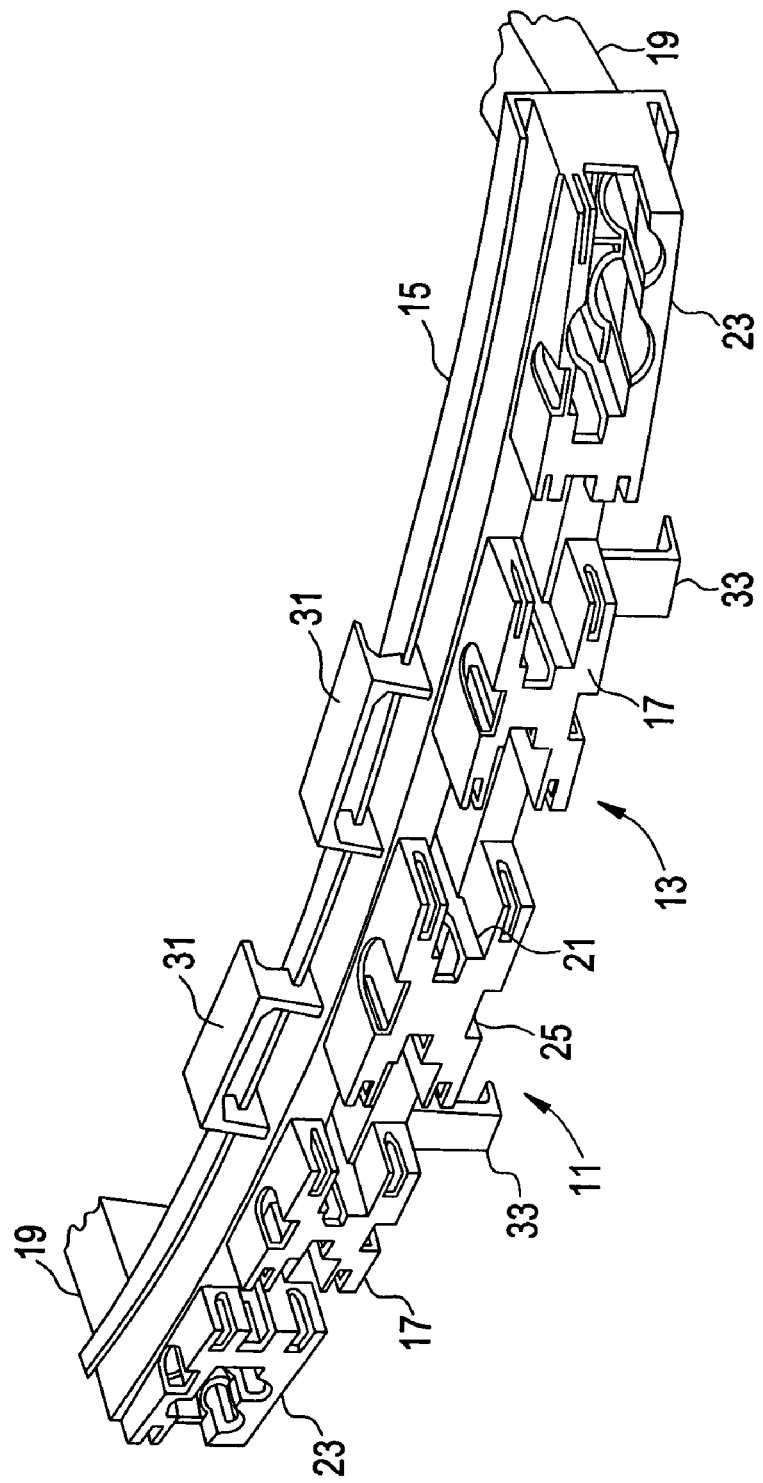
FIG. 1 is a perspective view of the singular solitary bumper unit illustrating the integrated energy absorber and reinforcing bumper beam.
Figure 7:
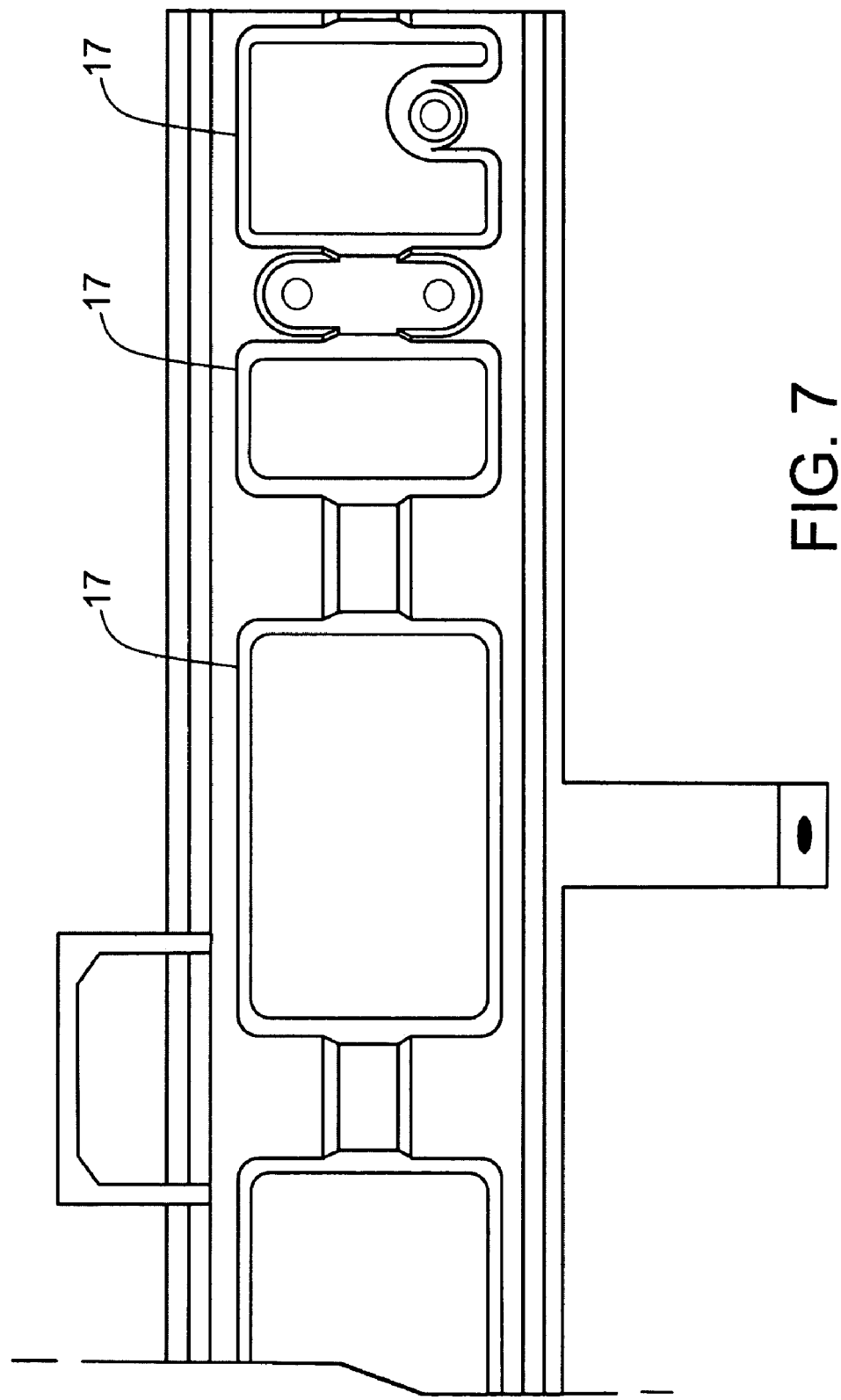
FIG. 7 is schematic illustration of a partial front view of the solitary bumper shown in FIG. 1 accordance with another embodement.
Figure 8:
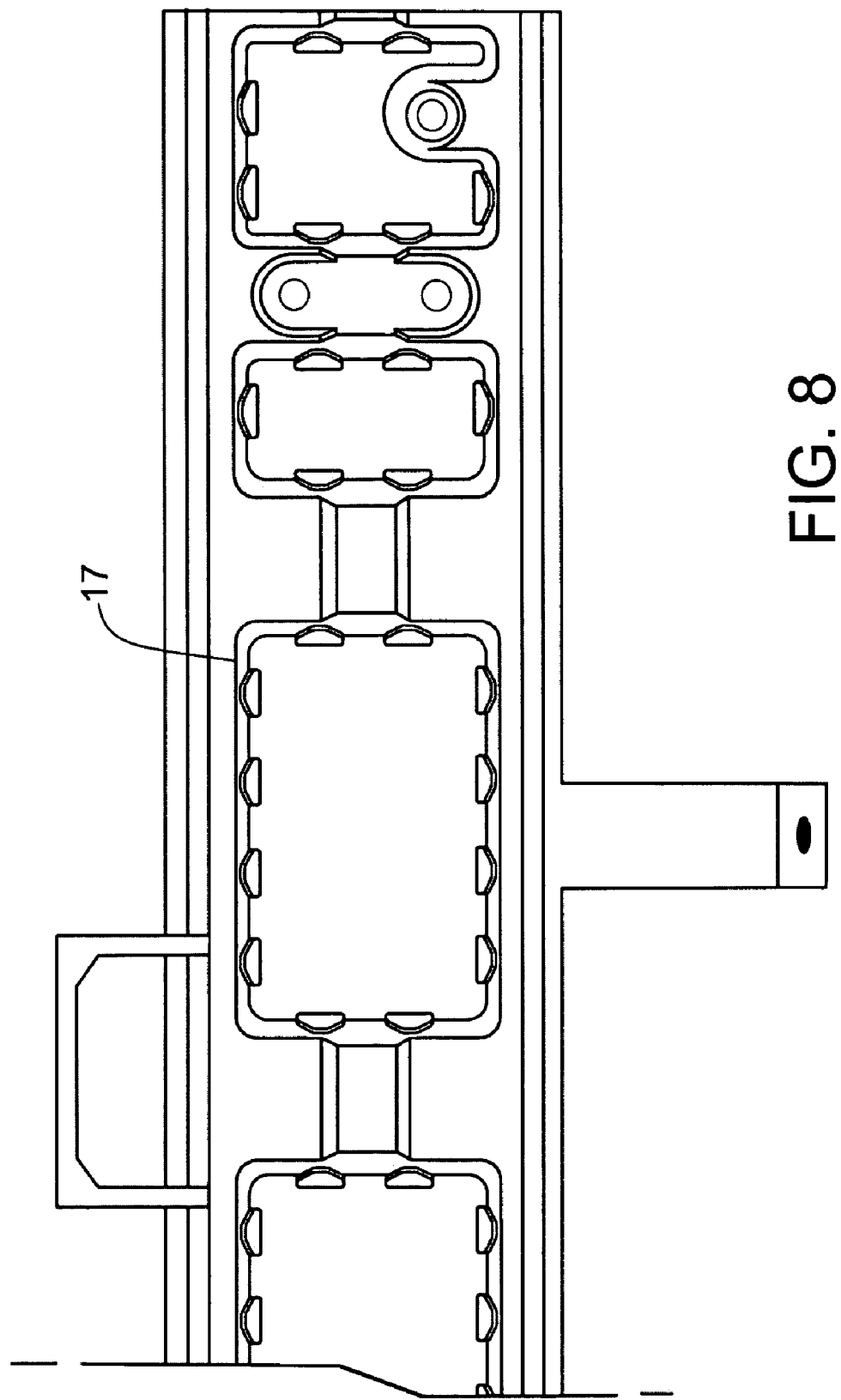
FIG. 8 is a schematic illustration of a partial front view of the singular solitary bumper shown in FIG. 1 in accordance with another embodiment.
Figure 9:
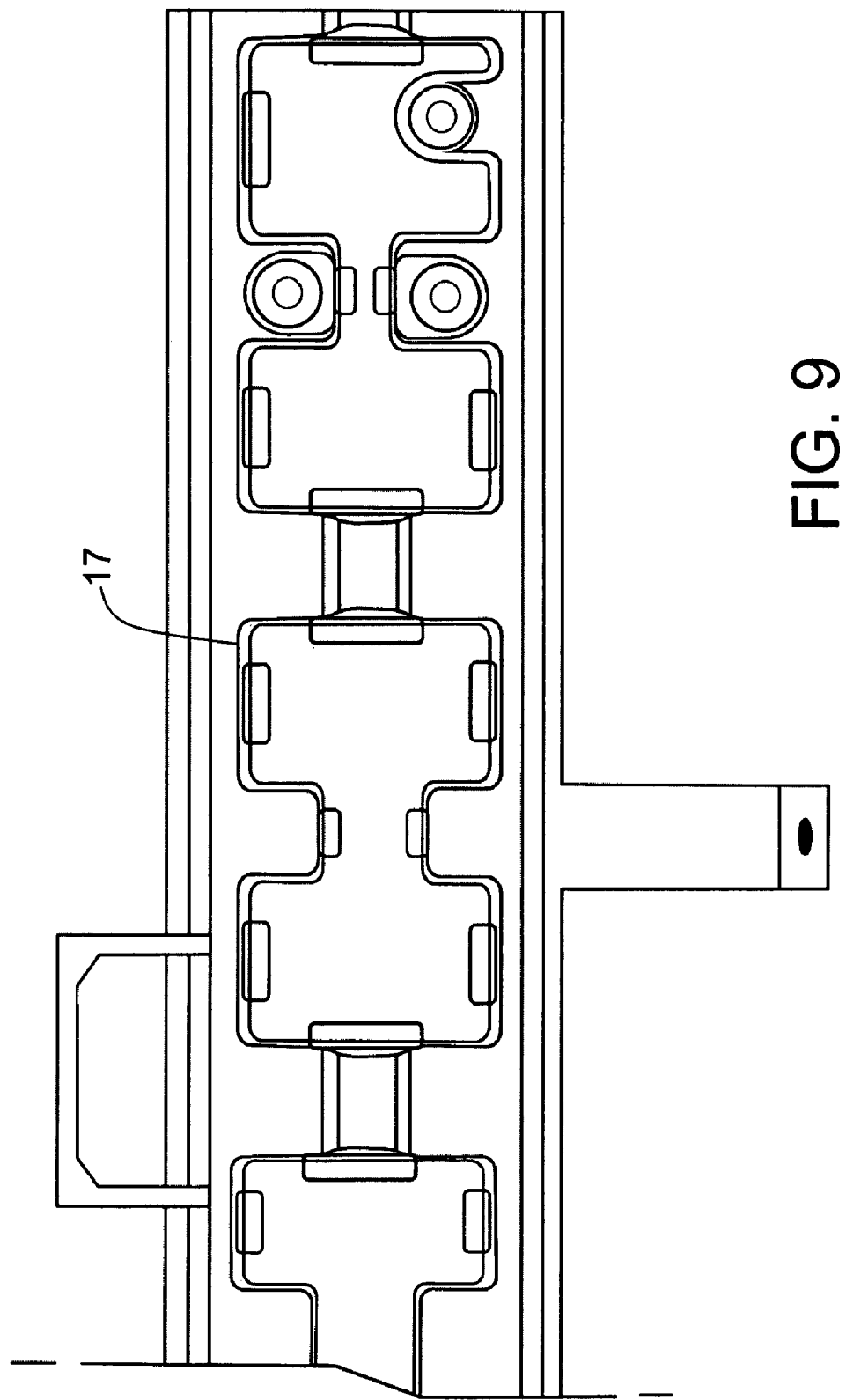
FIG. 9 is a schematic illustration of a partial front view of the singular solitary bumper shown in FIG. 1 in accordance with another embodiment.

FIG. 1 illustrates a bumper unit 11 comprising having an energy absorber position 13 and a bumper beam portion 15 formed as a singular or solitary thermoplastic unit which is adapted for attached directly to forward projecting supports or rails 19 of a motor vehicle. The combination bumper unit 11 may be adapted to achieve efficient energy absorption upon impact for pedestrian protection to meet FMVSS and ECE 42 type impact forces. Impact forces during low speed FMVSS and ECE 42 impact and the forces on a lower leg during pedestrian impact are maintained just below a predetermined level of deforming the bumper unit 11 until the kinetic energy of the impact event has been absorbed. When the impact is over, the bumper unit 11 is desirably adapted to return substantially to its original shape and still retain sufficient integrity to withstand subsequent impacts. The bumper unit 11 may be adapted for the combination of low speed impact FMVSS and ECE 42 performance, Allianz offset impact, and pedestrian lower and upper leg protection. Functionality in a molded beam portion 15 and energy absorber portion 13 is provided by crushable members 17 which are integrally molded into the single injection molded unit. Some deformation of the beam portion 15 may also occur upon impact. After impact, it is desirable to have deformations in the energy absorbing portion 13 be adapted to return substantially to their original shape. Such performance translates to reduced costs of repair for low speed (so called "fender benders") and desirable reductions in pedestrian leg injury. The solitary bumper unit 11 incorporates crushable members 17 which are desirably adapted through geometric shape, wall thickness, and other functionality to enhance lower and/or upper pedestrian leg protection during impact. The crushable members 17 are desirably adapted to deform during impact and absorb energy. The energy absorption efficiency of the crushable members 17 desirably reduces the forces translated into a pedestrian's leg during impact. Variations to the shape, wall thickness, and depth of crushable members 17 tune the energy absorber portion 13 to an impact response for specific impact energy levels. Preferably the crushable members 17 are forwardly projecting thin joined walls 21 formed as hollow sections which may be in the shape of crushable lobes, such as cans (FIG. 1), boxes (FIG. 7), H-shaped (FIG. 9), or I-shaped (FIG. 1), and can include arcuate walls (FIG. 8) and/or joined walls (FIG. 7).

The energy absorber portion 13 incorporates forwardly projecting crushable members 17 which may be the form of crush lobes, crush cans or other geometry which incorporates a desired functionality when molded together with the beam portion in the same single molding operation. The crushable members 17 are desirably adapted to provide for protection of pedestrians on impact. Enhanced energy absorption efficiency of the crushable members 17 desirable reduces the forces translated into a pedestrian lower leg during impact. The forwardly projection crushable members 17 may be spaced apart along the length of the elongated beam portion 15. FIG. 1 illustrates an embodiment where a pair of end crushable members 23 are, respectively, located at the ends of the beam portion 15 over or adjacent to the respective rails 19. The end crushable members 23 are adapted to absorb energy by deforming to protect the vehicle rail tips from damage during impact such as might occur during an Allianz offset impact test. The integrated beam portion 15 is shown schematically in FIG. 6 as being attached to respective supports or rails 19 which extend outwardly from the front of the vehicle and are typically attached to the vehicle frame. Since both the crushable members 17 and the beam portion 15 are formed in a single molding operation from the same thermoplastic material, the bumper unit 11 may be desirable recycled.

The engineering thermoplastic resins that can be employed in this practice of this invention can be any of the well-known engineering thermoplastics. This include for example aromatic polycarbonates; copolyester carbonate; polyester such as polybutylene terephthalate, polyethylene terephthalate, polypropylene terephthalate; polyphenylene ether; polyurethene; polyethlenes (high density and low density); polypropylenes; polysulphones; acrylates (homo and copolymers) such as polyethyl meth-acrylate, polymethylmethacrlate and the like; blends of the above engineering polymers and blends thereof with an elastomeric polymer and blends with other polymers such as polycarbonate/polybutylene terephthalate, polyphenylenether/high impact polystyrene, polycarbone/acrylonitrile-butadiene-styrene, and the like The preferred engineering thermoplastic resin is blend of aromatic polycarbonate and a polyester such as polybutylene terephthalate (PBT) or polyethylene terephthalate (PET) or a blend of polycarbonate with a blend of PBT and PET Referring to FIG. 1, bumper unit 11 includes bumper beam 15 with integral energy absorber portion 13, which includes crushable members 17 spaced apart in a lateral direction along the length of the beam portion 15. Each crushable member 17 comprises a plurality of forwardly projecting molded joined wall portions 21 which extend in different lateral directions. As shown in FIG. 5, joined wall portions 21 form molded hollow thin walled areas of the final molded part, which project forwardly. For purposes of discussion, the terms forwardly and rearward are not intended to be unduly limited but are intended to aid in the description of the relationship of the various features and sections described herein. Forward and rearward direction refers to a direction along an axis extending longitudinally along a forward and rearward aligned direction corresponding to the front and rear of the vehicle. Lateral directions are directions in a plane normal to the longitudinal axis. As shown in FIG. 1, and as previously discussed, end crushable members 17 are positioned adjacent respective ends of the beam portion 15 and have a box shaped configuration with a portion an end wall cut away. Other crushable members 17 are illustrated in FIG. 1 as having an I-shaped configuration. The I-shaped configuration includes a vertical wall portion 29 joining a lateral or horizontal wall portion 27. The crushable members 17 are spaced along the beam portion 15 intermediate the pair of end crushable members 23. Various positioning of the crushable members 17 are contemplated including both even and uneven spacing. Other configurations for the crushable members 17 are contemplated, such other configurations include forwardly projecting lobes, cones or other arcuate or joined walls or configurations.

As illustrated in FIG. 1, the beam portion 15 includes an integrated upper fascia support 31 and integrated lower fascia support 33. FIG. 3, a schematic view, shows a partial view of the fascia 43 fastened to the upper fascia support 31. FIG. 4, a schematic view, shows a partial view of the fascia 43 fastened to the lower fascia support 35. The fascia 43, which typically envelopes the bumper unit 11 may be a thermoplastic resin and which may be injection molded.

The box shaped end crushable members 23 are shaped for vehicle rail 19 protection, in particular for offset impact. As illustrated in the FIG. 6 schematic view, along section 6—6 of FIG. 2, the beam portion 15 is joined to the rails 19 with fasteners 35 such as bolts and nuts. The rails 19 extend forwardly in a longitudinally direction from the front vehicle. Such rails are well known in the automotive field to provide for attached of the bumper to an automotive vehicle.

FIG. 3 is a schematic cross sectional view along cross section of FIG. 2 and illustrates a cross section of the beam portion 15. The beam portion may include at least one corrugation 37 extending in the lateral direction to provide stiffness to the beam portion 15.

FIG. 5 schematically illustrates the cross section along section 5—5 and shows the beam portion 15 having a thicker cross sectional area than the forwardly projecting crushable members 17. For example, the walls may have a thickness that broadly ranges from about 1.0 mm to about 7.0 mm. More specifically, for certain low speed or pedestrian impact applications the nominal wall thickness may generally range from about 1.0 mm to about 5.0 mm and for other applications, particularly those for a 5 mph FMVSS system, the nominal wall thickness for the side and rear walls would more likely be in the range of about 2.5 mm to 7.0 mm. The beam portion has wall thicknesses that enhance the stiffness of the beam portion so as to resist deformation do to impact. Wall thickness for the beam may be the range from about 3 to about 10, preferable from about 4 to about 6 mm.

While it will be apparent that the preferred embodiments of this invention as disclosed herein are well calculated to fulfill the objects stated, it will be appreciated that the invention is susceptible to modifications, variations, and changes without departing from the spirit and scope of the present invention being limited only in terms of the appended claims.

What is claimed:

1. An unitary bumper unit adapted for attachment to a vehicle for absorbing forces generated from an impact comprising a singularly molded part combining a relatively stiff beam portion for attachment to a vehicle and an impact energy absorber integrally molded together with the beam portion wherein said energy absorber faces in a forward direction for absorbing energy due to an impact, said energy absorber comprising a plurality of crushable forward projecting members adapted to crush upon impact, and spaced apart longitudinally along said beam portion, said unitary bumper unit formed from a thermoplastic material.

2. An unitary bumper unit adapted for attachment to a vehicle for absorbing forces generated from an impact according to claim 1 wherein said unitary bumper unit has an elongated shape and is adapted for mounting to the forward end of a vehicle and extending longitudinally across the width of the vehicle.

3. An unitary bumper unit adapted for attachment to a vehicle for absorbing forces generated from an impact according to claim 2 wherein said energy absorber portion provides pedestrian leg protection.

4. An unitary bumper unit adapted for attachment to a vehicle for absorbing forces generated from an impact according to claim 2 wherein said energy absorber portion reduces forces of impact with legs of a pedestrian.

5. An unitary bumper unit adapted for attachment to a vehicle for absorbing forces generated from an impact according to claim 2 wherein the energy absorber portion absorbs energy during an impact of said vehicle at low speeds of less than or equal to 5 Mph.

6. An unitary bumper unit adapted for attachment to a vehicle for absorbing forces generated from an impact according to claim 2 wherein said energy absorber portion and said integrated beam portion comprise a single integral unit of injection molded material.

7. An unitary bumper unit adapted for attachment to a vehicle for absorbing forces generated from an impact according to claim 6 wherein said energy absorber portion comprises a plurality of forwardly projecting crushable members.

8. An unitary bumper unit adapted for attachment to a vehicle for absorbing forces generated from an impact according to claim 7 wherein said crusable members have relatively thin wall portions and said beam portion has relatively thick wall portions.

9. An unitary bumper unit adapted for attachment to a vehicle for absorbing forces generated from an impact according to claim 8 wherein said crushable members comprise a plurality of injection molded joined wall portions extending outwardly from the beam portion which result in a hollow portion in said beam.

10. An unitary bumper unit adapted for attachment to a vehicle for absorbing forces generated from an impact according to claim 9 wherein said crushable members have at least two different configurations.

11. An unitary bumper unit adapted for attachment to a vehicle for absorbing forces generated from an impact according to claim 10 wherein said at least two configurations are selected from the group consisting of a box, can, arcuate wall, joined wall, I-shape, and H-shaped configuration.

12. An unitary bumper unit adapted for attachment to a vehicle for absorbing forces generated from an impact according to claim 10 wherein said attachment to said vehicle is to a vehicle support, said beam portion includes a section adapted for attachment to said vehicle support.

13. An unitary bumper unit adapted for attachment to a vehicle for absorbing forces generated from an impact according to claim 12 wherein said energy absorber comprises a pair of crushable members positioned to absorb impact directed to said vehicle support.

14. An unitary bumper unit adapted for attachment to a vehicle for absorbing forces generated from an impact according to claim 10 wherein the unitary beam is injection molded as a single piece with a thermoplastic resin.

15. An unitary bumper unit adapted for attachment to a vehicle for absorbing forces generated from an impact according to claim 14 wherein said thermoplastic comprises a polyester material.

16. An unitary bumper unit adapted for attachment to a vehicle for absorbing forces generated from an impact according to claim 14 wherein said thermoplastic comprises a polycarbonate material.

17. An unitary bumper unit adapted for attachment to a vehicle for absorbing forces generated from an impact according to claim 14 wherein said thermoplastic resin is a blend of a polyester resin and at least one of an aromatic polycarbonate, a high density polyethylene, a low density polyethylene, and a polyamide.

18. A vehicle bumper unit for an automotive vehicle according to claim 14 including a fascia.

19. The vehicle bumper unit of claim 18 wherein the fascia is formed from a thermoplastic resin.

* * * * *